United States Patent
Gao

(10) Patent No.: US 11,631,344 B2
(45) Date of Patent: *Apr. 18, 2023

(54) ENCRYPTION AND DECRYPTION METHOD BASED ON GENE CHIP

(71) Applicant: AMBIT MICROSYSTEMS (SHANGHAI) LTD., Shanghai (CN)

(72) Inventor: Jing Gao, Shanghai (CN)

(73) Assignee: AMBIT MICROSYSTEMS (SHANGHAI) LTD., Shanghai (CN)

( * ) Notice: Subject to any disclaimer, the term of this patent is extended or adjusted under 35 U.S.C. 154(b) by 134 days.

This patent is subject to a terminal disclaimer.

(21) Appl. No.: 17/243,352

(22) Filed: Apr. 28, 2021

(65) Prior Publication Data

US 2021/0264817 A1 Aug. 26, 2021

Related U.S. Application Data

(63) Continuation of application No. 16/439,981, filed on Jun. 13, 2019, now Pat. No. 11,043,147.

(30) Foreign Application Priority Data

Apr. 19, 2019 (CN) .......................... 201910321559.7

(51) Int. Cl.
| | |
|---|---|
| *G06F 21/00* | (2013.01) |
| *H04L 29/06* | (2006.01) |
| *G09C 1/00* | (2006.01) |
| *H04L 9/06* | (2006.01) |
| *G06F 21/60* | (2013.01) |

(52) U.S. Cl.
CPC .................. *G09C 1/00* (2013.01); *H04L 9/06* (2013.01); *G06F 21/602* (2013.01)

(58) Field of Classification Search
CPC ............ G06F 21/602; G09C 1/00; H04L 9/06
See application file for complete search history.

(56) References Cited

U.S. PATENT DOCUMENTS

| | | | | |
|---|---|---|---|---|
| 2005/0019815 | A1* | 1/2005 | Gladyshev | C07K 14/47 514/19.5 |
| 2005/0158736 | A1* | 7/2005 | Shaw | G16Z 99/00 435/6.13 |
| 2009/0191553 | A1* | 7/2009 | Hendrickson | C12Q 1/6874 435/6.1 |
| 2013/0335635 | A1* | 12/2013 | Ghanem | G06T 7/33 348/571 |
| 2015/0163060 | A1* | 6/2015 | Tomlinson | H04L 9/304 380/30 |

FOREIGN PATENT DOCUMENTS

| | | |
|---|---|---|
| CN | 103310157 A | 9/2013 |
| CN | 106817218 A | 6/2017 |
| CN | 108122188 A | 6/2018 |

* cited by examiner

*Primary Examiner* — Philip J Chea
*Assistant Examiner* — Rodman Alexander Mahmoudi
(74) *Attorney, Agent, or Firm* — ScienBiziP, P.C.

(57) ABSTRACT

A method for asymmetric encryption based on a gene chip includes the steps of (a) obtaining original information in text or image or other form and converting the same into a binary code, and (b) preprocessing the binary code to obtain a binary matrix. In (c), an encryption key is obtained, the encryption key comprising a gene expression solution. In (d), the gene expression solution is placed on a gene chip according to an arrangement and correspondence of the binary matrix.

20 Claims, 3 Drawing Sheets

ENCRYPTION AND DECRYPTION METHOD BASED ON GENE CHIP

FIELD

The subject matter herein generally relates to data security by encryption.

BACKGROUND

Deoxyribonucleic acid (DNA) encryption technology may provide reliable data security. Currently, a DNA-based symmetrical encryption method has low security rating and an end of a binary matrix directly converted by plaintext is completely filled with zeros. DNA-based symmetrical encryption ignores a potential danger of an end filling of a virtual chip. Moreover, the gene encryption methods generally select a synthetic nucleotide sequence to express a protein, which is difficult to manufacture and is very expensive.

Therefore, there is room for improvement within the art.

BRIEF DESCRIPTION OF THE DRAWINGS

Many aspects of the disclosure can be better understood with reference to the following figures. The components in the figures are not necessarily drawn to scale, the emphasis instead being placed upon clearly illustrating the principles of the disclosure. Moreover, in the drawings, like reference numerals designate corresponding parts throughout several views.

DETAILED DESCRIPTION

Figure 1:
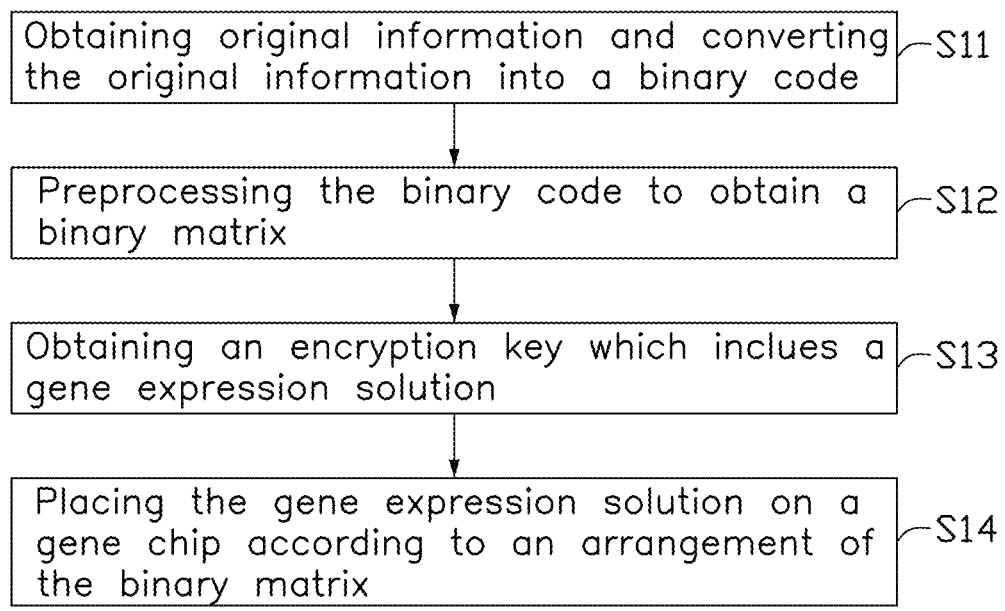
FIG. 1 is a flowchart of a method of asymmetric encryption based on a gene chip according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising," when utilized, means "including, but not necessarily limited to"; it specifically indicates open-ended inclusion or membership in the so-described combination, group, series, and the like.

FIG. 1 illustrates a flowchart of a method of asymmetric encryption based on a gene chip. The method is provided by way of example, as there are a variety of ways to carry out the method. Each block shown in FIG. 1 represents one or more processes, methods, or subroutines which are carried out in the example method. Furthermore, the order of blocks is illustrative only and additional blocks can be added or fewer blocks may be utilized without departing from the scope of this disclosure.

At block S11, original information or data is obtained and is converted into a binary code.

In one embodiment, the original information may be text-based. The textual information is converted into a binary code according to an American Standard Code for Information Interchange (ASCII) encoding rule. For example, when original text "Hello" is obtained, the same can be converted into a binary code "0100100001100101011011000110110001101111" according to the ASCII encoding rule.

In other embodiments, the original information may also be image-based. The image can also be converted into a binary code through sampling, quantization, and encoding.

At block S12, the binary code is preprocessed to obtain a binary matrix.

In one embodiment, the binary matrix is a matrix of seven rows and six columns (7*6). That is, a binary number of the binary matrix is 42.

In one embodiment, the method for preprocessing the binary code to obtain the binary matrix at least includes the following sub-blocks S121, S122, and S123.

At sub-block S121, when a bit number of the binary code is less than the number of elements of the binary matrix, zero ("0") is added to an end of the binary code until the bit number of the binary code is equal to the number of elements of the binary matrix.

At sub-block S122, the processed binary code is converted to a transitional binary matrix.

In sub-block S122, the transitional binary matrix is also a matrix of seven rows and six columns (7*6). That is, a binary number of the transitional binary matrix is 42.

At sub-block S123, the transitional binary matrix is scrambled to obtain the binary matrix.

In one embodiment, the transitional binary matrix is scrambled according to an Inexact Augmented Lagrange Multiplier (IALM) algorithm.

In other embodiments, the transitional binary matrix can be scrambled according to other algorithms.

For example, the original information in text form is "Hello". The "Hello" can be converted into a binary code "0100100001100101011011000110110001101111" according to the ASCII encoding rule. Since a bit number of the binary code "0100100001100101011011000110110001101111" is less than the number of elements of the binary matrix, zeros are added to an end of the binary code "0100100001100101011011000110110001101111" until the bit number of the binary code is equal to the number of elements of the binary matrix. In this case, two zeros are added to the binary code to obtain "010010000110010101101100011011000110111100". The binary code with added zeros is converted to a transitional binary matrix (1) as follow:

$$\begin{pmatrix} 0 & 1 & 0 & 0 & 1 & 0 \\ 0 & 0 & 0 & 1 & 1 & 0 \\ 0 & 1 & 0 & 1 & 0 & 1 \\ 0 & 0 & 1 & 1 & 0 & 0 \\ 0 & 1 & 1 & 0 & 1 & 1 \\ 0 & 0 & 0 & 1 & 1 & 0 \\ 1 & 1 & 1 & 1 & 0 & 0 \end{pmatrix} \quad \text{transitional binary matrix (1)}$$

Finally, the above transitional binary matrix (1) is scrambled to obtain a binary matrix (2) as follow.

$$\begin{pmatrix} 1 & 1 & 0 & 1 & 1 & 0 \\ 0 & 1 & 0 & 0 & 0 & 1 \\ 1 & 0 & 1 & 1 & 0 & 0 \\ 0 & 0 & 1 & 0 & 1 & 1 \\ 1 & 0 & 1 & 0 & 1 & 1 \\ 0 & 0 & 0 & 1 & 0 & 1 \\ 0 & 1 & 1 & 0 & 0 & 1 \end{pmatrix} \quad \text{binary matrix (2)}$$

At block S13, an encryption key is obtained. The encryption key includes a gene expression solution.

In one embodiment, the encryption key can be obtained through an in vitro expression experiment of a selenoprotein gene.

In detail, the method for obtaining the encryption key through such experiment can include obtaining two groups of gene expression solutions through such experiments. The first group of gene expression solutions includes a nucleotide sequence which can express selenoprotein. The nucleotide sequence of the second group of gene expression solutions cannot express selenoprotein.

In one embodiment, the encryption key can include a nucleotide sequence which can express selenoprotein and a nucleotide sequence which cannot express selenoprotein.

In other embodiments, the encryption key can include only the nucleotide sequence which can express selenoprotein.

In one embodiment, the nucleotide sequence in the gene expression solution can be obtained through cleavage or polymerase chain reaction to amplify a natural nucleotide sequence of selenoprotein.

In one embodiment, the selenoprotein may be a protein including selenocysteine, for example, a thioredoxin reductase of a mammalian system. The thioredoxin reductase provides two groups of gene expression solutions through in vitro expression experiments. The first group of solutions includes a nucleotide sequence which can express thioredoxin reductase. The nucleotide sequence of the second group of solutions cannot express the thioredoxin reductase.

In other embodiments, the selenoprotein may be thioredoxin reductase. The thioredoxin reductase obtains a group of gene expression solution through in vitro expression experiments. The solution only includes nucleotide sequence which can express thioredoxin reductase. Then the encryption key is obtained through the solution which includes the expressing nucleotide sequence.

At block S14, the gene expression solution is placed on a gene chip according to an arrangement of the binary matrix.

In one embodiment, the method for placing the gene expression solution on the gene chip may be selecting a gene expression solution corresponding to information of elements in the binary matrix, and placing the gene expression solution on a corresponding position of the gene chip.

For example, in one embodiment, a nucleotide sequence having selenoprotein can be placed at a first position corresponding to the binary number "1" of the binary matrix (2). A nucleotide sequence without selenoprotein can be placed at a second position corresponding to the binary number "0" of the binary matrix (2). Thereby, a gene chip using nucleotide sequence to express information is obtained.

Figure 2:
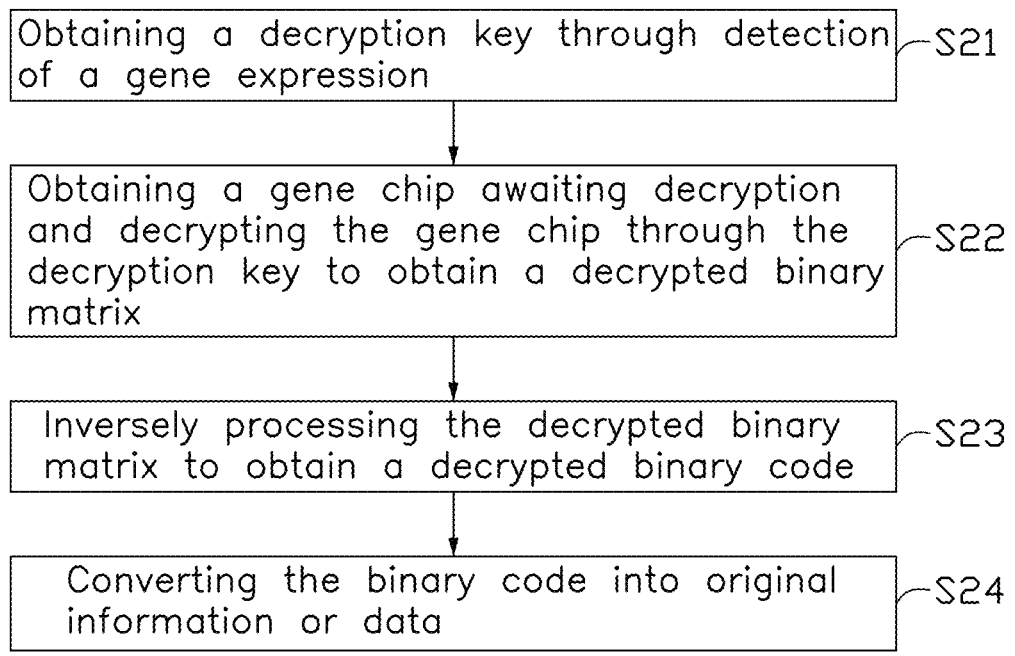
FIG. 2 is a flowchart of a method of asymmetric decryption based on a gene chip according to an embodiment of the present disclosure.

FIG. 2 illustrates a flowchart of a method of asymmetric decryption based on a gene chip. The method is provided by way of example, as there are a variety of ways to carry out the method. Each block shown in FIG. 2 represents one or more processes, methods, or subroutines which are carried out in the example method. Furthermore, the order of blocks is illustrative only and additional blocks can be added or fewer blocks may be utilized without departing from the scope of this disclosure.

At block S21, a decryption key is obtained through detection of a gene expression.

In one embodiment, the method for obtaining the decryption key through such detection is to obtain a decrypted nucleotide sequence in a mixed solution of DNA biochemical reagent through a predetermined experiment. The decrypted nucleotide sequence is then the decryption key.

In one embodiment, the DNA biochemical reagent may be an essential component of an organism. The main component of the DNA biochemical reagent is an amino acid.

In one embodiment, the predetermined experiment is an electrophoresis experiment. Then, the decrypted nucleotide sequence, that is, the decryption key, can be obtained through a hybridization reaction under the electrophoresis experiment.

At block S22, a gene chip awaiting decryption is obtained and the gene chip is decrypted through the decryption key to obtain a decrypted binary matrix.

In one embodiment, the method for decrypting the gene chip may be performed through an in vitro expression experiment of a decrypting gene.

In one embodiment, the method for obtaining the gene chip and performing the in vitro expression experiment of the decrypting gene on the gene chip and the decryption key to obtain decryption of a binary matrix may include sub-blocks S221, S222, and S223.

At sub-block S221, a decryption key chip is made using the decryption key. A number and position of the nucleotide sequences on the decryption key chip is consistent with the position and number of the gene expression solution arranged on the gene chip.

At sub-block S222, the gene chip is combined with the decryption key chip, and the nucleotide sequence of the selenoprotein on the gene chip is recorded through the nucleotide sequence of the decryption key.

In detail, when selenoprotein is detected in a predetermined region on the gene chip, the predetermined region is recorded as "1". When the predetermined region on the gene chip does not include selenoprotein, the predetermined region is recorded as "0".

At sub-block S223, according to such recording, the selenoprotein information on the gene chip is summarized to obtain the decrypted binary matrix.

In one embodiment, a surface of the gene chip is divided into 42 regions. Each region includes information encrypted by a nucleotide sequence of a gene expression solution. A surface of the decryption key chip is also divided into 42 regions. A method of dividing the regions of the decryption key chip is the same as the method applied to the gene chip. Each region of the decryption key chip includes a decrypted nucleotide sequence.

Figure 3:
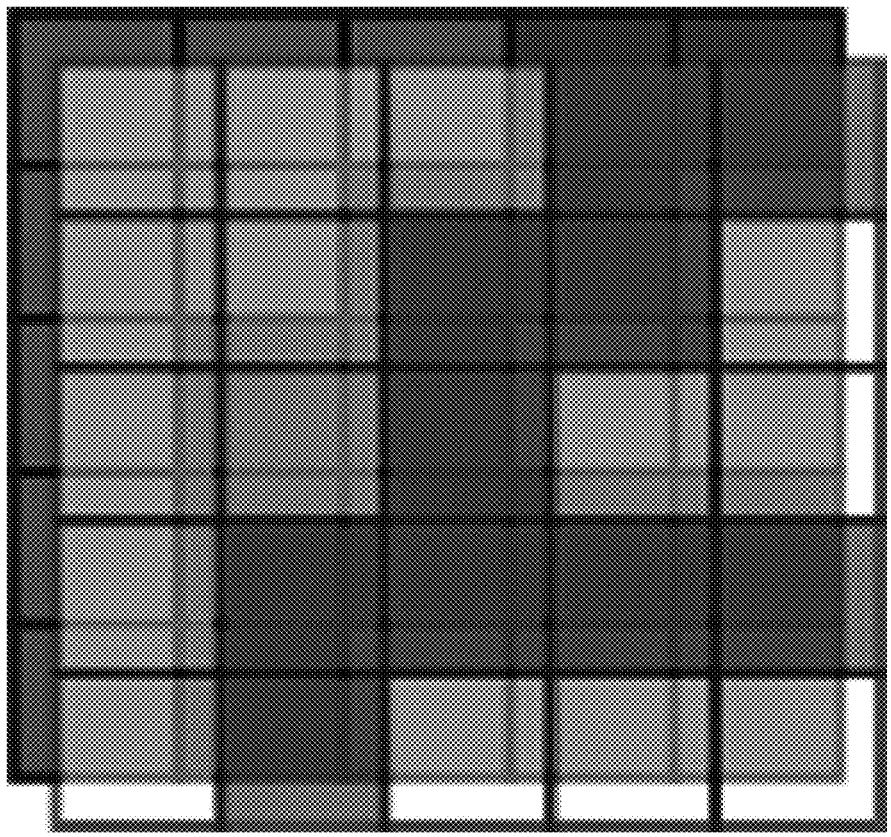
FIG. 3 is a schematic diagram showing a decryption key chip decrypting a gene chip according to an embodiment of the present disclosure.

As shown in FIG. 3, the gene chip is combined with the decryption key chip, so that each position on the decryption key chip coincides and corresponds with the position on the gene chip. Through an electrophoretic analysis method, the nucleotide sequence on the gene chip is recorded by the nucleotide sequence on the decryption key. By such recording, when a nucleotide sequence which can express selenoprotein is detected on the predetermined region on the gene chip, the predetermined region is recorded as "1". When the predetermined region is found to not include a nucleotide sequence which can express selenoprotein, the predetermined region is recorded as "0". According to such recording, the nucleotide sequence information on the gene chip is summarized to obtain the decrypted binary matrix.

At block S23, the decrypted binary matrix is inversely processed to obtain a decrypted binary code.

The method for inversely processing the decrypted binary matrix to obtain the decrypted binary code may include sub-blocks S231, S232, and S233.

At sub-block S231, the decrypted binary matrix is processed to obtain an inverse scrambled matrix.

In one embodiment, the decrypted binary matrix is processed according to an inverse algorithm of the IALM algorithm.

At sub-block S232, the redundant information added at the end of the inverse scrambled matrix is eliminated.

At sub-block S233, the inverse scrambled matrix without the redundant information is converted into a binary code.

In one embodiment, in order to construct a binary matrix in the encryption process, zero is added to an end of the binary code. Thus, after the decryption is completed, the added zero at the end of the inverse scrambled matrix needs to be eliminated. The inverse scrambled matrix without redundant information (the redundant information is "0" at the end of the binary matrix in this embodiment) is then converted into the binary code.

At block S24, the binary code is converted into the original information or data.

In one embodiment, when the obtained binary code information is "01001000011001010110110001101100011011111", the binary code will be converted back into the text "Hello" according to the ASCII coded rule.

It is believed that the embodiments and their advantages will be understood from the foregoing description, and it will be apparent that various changes may be made thereto without departing from the scope of the disclosure or sacrificing all of its advantages, the examples hereinbefore described merely being illustrative embodiments of the disclosure.

What is claimed is:

1. A method of asymmetric encryption and decryption based on a gene chip, the method comprising:
    obtaining original information and converting the original information into a binary code;
    preprocessing the binary code to obtain a binary matrix;
    obtaining an encryption key through an in vitro expression experiment of selenoprotein genes;
    obtaining a first group of the gene expression solutions and a second group of the gene expression solutions through the in vitro expression experiments of the selenoprotein gene, wherein the encryption key comprises the first group and the second group of the gene expression solutions;
    placing the first group and the second group of the gene expression solutions on a gene chip according to an arrangement of the binary matrix;
    obtaining a decryption key through detection of the gene expressions;
    decrypting the gene chip through the decryption key to obtain a decrypted binary matrix;
    inversely processing the decrypted binary matrix to obtain a decrypted binary code; and
    converting the binary code into original information.

2. The method of claim 1, wherein the first group of the gene expression solutions comprises a nucleotide sequence which can express selenoprotein, and the second group of the gene expression solutions comprises a nucleotide sequence which cannot express selenoprotein.

3. The method of claim 2, wherein the nucleotide sequence in the first group of gene expression solutions and the nucleotide sequence in the second group of gene expression solutions are obtained through cleavage and polymerase chain reaction to amplify a nucleotide sequence of selenoprotein in nature.

4. The method of claim 1, wherein the step of preprocessing the binary code to obtain the binary matrix further comprises:
    adding zeros to an end of the binary code until a bit number of the binary code being equal to a number of elements of the binary matrix; and
    converting the binary code with added zeros to the binary matrix.

5. The method of claim 4, wherein the step of preprocessing the binary code to obtain the binary matrix further comprises:
    scrambling the elements of the binary matrix according to a predetermined algorithm.

6. The method of claim 1, wherein the encryption key is at least one of the first group of gene expression solutions and the second group of gene expression solutions.

7. The method of claim 1, wherein the step of placing the first group and the second group of the gene expression solutions on the gene chip according to the arrangement of the binary matrix further comprises:
    selecting a gene expression solution corresponding to information of elements in the binary matrix; and
    placing the gene expression solution on a corresponding position of the gene chip.

8. The method of claim 1, wherein, in the step of decrypting the gene chip through the decryption key to obtain the decrypted binary matrix, the gene chip is decrypted through an in vitro expression experiment of a decrypting gene.

9. The method of claim 8, wherein the step of obtaining the decryption key through detection of the gene expressions further comprises:
    obtaining a decrypted nucleotide sequence in a mixed solution of DNA biochemical reagent through a predetermined experiment;
    wherein the decrypted nucleotide sequence is the decryption key.

10. The method of claim 1, wherein the step of decrypting the gene chip through the decryption key to obtain the decrypted binary matrix further comprises:
    making a decryption key chip using the decryption key, wherein a number and a position of the nucleotide sequences on the decryption key chip is consistent with a position and a number of the gene expression solution arranged on the gene chip;
    combining the gene chip with the decryption key chip, and recording a nucleotide sequence of the selenoprotein on the gene chip through a nucleotide sequence of the decryption key;

summarizing the selenoprotein information on the gene chip according to the recording to obtain the decrypted binary matrix.

11. The method of claim 10, wherein when a predetermined region on the gene chip is detected to include selenoprotein, the predetermined region is recorded as "1", and when the predetermined region on the gene chip does not include selenoprotein, the predetermined region is recorded as "0".

12. The method of claim 1, wherein the step of inversely processing the decrypted binary matrix to obtain the decrypted binary code further comprises:
processing the decrypted binary matrix to obtain an inverse scrambled matrix;
eliminating redundant information added at the end of the inverse scrambled matrix; and
converting the inverse scrambled matrix without the redundant information into the binary code.

13. The method of claim 12, wherein the decrypted binary matrix is processed according to an inverse algorithm of an Inexact Augmented Lagrange Multiplier (IALM) algorithm.

14. An electronic device, comprising:
at least one processor;
a storage device for storing a plurality of reference points defined according to a movement area thereof and connecting to a server via a network;
one or more programs that are stored in the storage and executed by the at least one processor;
the at least one processor configured to:
obtain original information and converting the original information into a binary code;
preprocess the binary code to obtain a binary matrix;
obtain an encryption key through an in vitro expression experiment of selenoprotein genes;
obtain a first group of the gene expression solutions and a second group of the gene expression solutions through the in vitro expression experiments of the selenoprotein gene, wherein the encryption key comprises the first group and the second group of the gene expression solutions;
place the first group and the second group of the gene expression solutions on a gene chip according to an arrangement of the binary matrix;
obtain a decryption key through detection of the gene expressions;
decrypt the gene chip through the decryption key to obtain a decrypted binary matrix;
inversely process the decrypted binary matrix to obtain a decrypted binary code; and convert the binary code into original information.

15. The electronic device of claim 14, wherein the first group of the gene expression solutions comprises a nucleotide sequence which can express selenoprotein, and the second group of the gene expression solutions comprises a nucleotide sequence which cannot express selenoprotein.

16. The method of claim 15, wherein the nucleotide sequence in the first and the second gene expression solutions is obtained through cleavage and polymerase chain reaction to amplify a nucleotide sequence of selenoprotein in nature.

17. The method of claim 14, wherein the nucleotide sequence in the first group of gene expression solutions and the nucleotide sequence in the second group of gene expression solutions are obtained through cleavage and polymerase chain reaction to amplify a nucleotide sequence of selenoprotein in nature.

18. The method of claim 14, wherein the step of placing the first group and the second group of the gene expression solutions on the gene chip according to the arrangement of the binary matrix further comprises:
selecting a gene expression solution corresponding to information of elements in the binary matrix; and
placing the gene expression solution on a corresponding position of the gene chip.

19. The method of claim 14, wherein the step of decrypting the gene chip through the decryption key to obtain the decrypted binary matrix further comprises:
making a decryption key chip using the decryption key, wherein a number and a position of the nucleotide sequences on the decryption key chip is consistent with a position and a number of the gene expression solution arranged on the gene chip;
combining the gene chip with the decryption key chip, and recording a nucleotide sequence of the selenoprotein on the gene chip through a nucleotide sequence of the decryption key;
summarizing the selenoprotein information on the gene chip according to the recording to obtain the decrypted binary matrix.

20. The method of claim 19, wherein when a predetermined region on the gene chip is detected to include selenoprotein, the predetermined region is recorded as "1", and when the predetermined region on the gene chip does not include selenoprotein, the predetermined region is recorded as "0".

* * * * *